US007588365B2

United States Patent
Katsumata (10) Patent No.: US 7,588,365 B2
(45) Date of Patent: Sep. 15, 2009

(54) METHOD OF MANUFACTURING LIGHT GUIDE PLATE, LIGHT GUIDE PLATE, BACKLIGHT UNIT WITH THE LIGHT GUIDE PLATE AND DISPLAY APPARATUS HAVING THE SAME

(75) Inventor: Toshinobu Katsumata, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 0 days.

(21) Appl. No.: 12/137,280

(22) Filed: Jun. 11, 2008

(65) Prior Publication Data

US 2008/0310184 A1 Dec. 18, 2008

(30) Foreign Application Priority Data

Jun. 14, 2007 (JP) .............................. 2007-158073

(51) Int. Cl.
*F21V 8/00* (2006.01)
(52) U.S. Cl. ...................................... 362/623; 362/624
(58) Field of Classification Search ................. 362/623, 362/624, 625, 627
See application file for complete search history.

(56) References Cited

U.S. PATENT DOCUMENTS

| 5,134,549 A | * | 7/1992 | Yokoyama | ................ | 362/623 |
| 6,712,482 B2 | * | 3/2004 | Kawakami et al. | .......... | 362/623 |
| 6,767,106 B2 | * | 7/2004 | Barnes et al. | ................ | 362/600 |
| 6,943,857 B2 | * | 9/2005 | Tsubokura et al. | .......... | 349/112 |
| 6,991,359 B2 | * | 1/2006 | Leu et al. | ..................... | 362/624 |
| 2006/0291252 A1 | * | 12/2006 | Lim et al. | ................... | 362/618 |
| 2007/0189040 A1 | * | 8/2007 | Chi et al. | ..................... | 362/620 |

FOREIGN PATENT DOCUMENTS

| JP | H07-56022 | 3/1995 |
| JP | 3136189 | 12/2000 |
| JP | 2005-26223 | 1/2005 |

\* cited by examiner

*Primary Examiner*—Laura Tso
(74) *Attorney, Agent, or Firm*—Brinks Hofer Gilson & Lione

(57) ABSTRACT

A method of producing an edge-light type light guide plate having a light exiting surface and a light reflecting surface having light reflective dots formed thereon in a scattered fashion. The method includes (a) producing a first prototype of the light guide plate having primary dots formed on the light reflecting surface, (b) examining optical characteristics of the first prototype relating to light exiting from the light exiting surface thereof, and (c) producing a second prototype of the lightguide plate when the examined first prototype exhibits unsatisfactory optical characteristics. The second prototype has primary dots that are the same as the primary dots of the first prototype in size and distribution, and secondary dots arranged between the primary dots in at least part of the light reflecting surface. The steps (b) and (c) are repeated until a prototype is produced which exhibits satisfactory optical characteristics.

16 Claims, 7 Drawing Sheets

METHOD OF MANUFACTURING LIGHT GUIDE PLATE, LIGHT GUIDE PLATE, BACKLIGHT UNIT WITH THE LIGHT GUIDE PLATE AND DISPLAY APPARATUS HAVING THE SAME

This application claims priority under 35 U.S.C. §119 to Japanese Patent application No. JP2007-158073 filed on Jun. 14, 2007, the entire contents of which are hereby incorporated by reference.

TECHNICAL FIELD

The present invention relates to light guide plates for use in display apparatus and the like.

RELATED ART

Liquid crystal display apparatus have been widely used in mobile phones, personal digital assistants (PDAs), automatic teller machines (ATMs), displays of personal computers, etc. These liquid crystal display apparatus employ a backlight unit that applies light to a liquid crystal display panel from the back thereof to enhance a luminance of the display screen.

The backlight unit uses a light guide plate that receives light from a light source such as LEDs (light-emitting diodes) and that applies the light toward the entire back surface of the liquid crystal display panel. This type of light guide plate is demanded to apply light to the liquid crystal display panel uniformly, and various improvements have been made thereto.

Japanese Patent Application Publication No. 2005-026223 and Japanese Patent No. 3136189 disclose an edge-light type light guide plate having a light exiting surface that emits light and a light reflecting surface opposite to the light exiting surface, in which the light reflecting surface has light diffusing reflective dots formed thereon in a desired distribution pattern to uniformly disperse light while the light is transmitted through the light guide plate.

Japanese Patent No. 3136189 also proposes a method of making a desired dot distribution pattern by a computer simulation using a preset relational expression.

The above-described conventional techniques, however, still have the following problems to be solved.

In the manufacture of a light guide plate, a mold having a dot pattern determined on the basis of a simulation or the like is made, and a resin is injected into the mold to produce a prototype of the light guide plate. Examination of luminance uniformity at the light exiting surface of the prototype, however, often reveals a failure to achieve a target luminance uniformity based on a simulation or the like. This may be due to various factors such as the flow of resin during the injection molding process. Accordingly, it is often necessary to remake the mold a plurality of times, which leads to an increased cost.

SUMMARY OF THE INVENTION

An object of the present invention is to improve the above-described disadvantages.

The present invention provides a method of producing a light guide plate having a light exiting surface and a light reflecting surface opposite to the light exiting surface. The light reflecting surface has a plurality of light reflective dots formed thereon in a scattered fashion. The method includes (a) producing a first prototype of the light guide plate in which primary dots are formed on a light reflecting surface of the first prototype, (b) examining optical characteristics of the first prototype relating to light exiting from the light exiting surface of the first prototype, (c) producing a second prototype of a light guide plate when the examined first prototype exhibits optical characteristics which are not satisfactory, the second prototype having, on the light reflecting surface thereof, primary dots that are the same as the primary dots of the first prototype in size and distribution, and secondary dots arranged between the primary dots in at least part of the light reflecting surface to improve the optical characteristics of the second prototype, and (d) repeating steps (b) and (c) until a prototype is produced which exhibits satisfactory optical characteristics, wherein the second prototype is examined in step (b).

According to this method, one mold is made, and a prototype of the light guide plate is produced by using the mold. Based on the prototype, the mold is subjected to additional processing. By repeating the steps, the mold can be surely finished to produce a light guide plate having satisfactory optical characteristics. Accordingly, the production cost of the mold can be reduced to a considerable extent as compared to the above-described conventional method. If a prototype of the light guide plate produced in the first prototype producing step (a) exhibits satisfactory optical characteristics, the prototype producing process is completed.

Specifically, the secondary dots formed in step (c) may be smaller in size than the previously formed dots.

More specifically, the primary dots and the secondary dots may be hemispherical or columnar projections projecting from the light reflecting surface.

In this case, the hemispherical or columnar secondary dots formed in step (c) may be smaller in diameter and height than the previously formed dots.

The secondary dots provided in a boundary area that borders the surrounding part of the at least part of the light reflecting surface may be distributed at a lower density than the secondary dots provided in an other area of the at least part of the light reflecting surface.

With the above-described arrangement, optical characteristics can be improved without a sharp change at the boundary area.

In addition, the present invention provides a light guide plate having a light exiting surface and a light reflecting surface opposite to the light exiting surface. The light reflecting surface has a plurality of light reflective dots formed thereon in a scattered fashion. The dots include primary dots and secondary dots arranged between the primary dots in at least part of the light reflecting surface to improve optical characteristics of the light guide plate relating to light exiting from the light exiting surface. The secondary dots have a lower reflectivity than the primary dots surrounding them.

The light guide plate can be produced at a reduced cost by the above-described method.

Specifically, the primary dots and the secondary dots may be hemispherical or columnar projections. The secondary dots may be smaller in diameter and height than the primary dots. More specifically, the primary dots may be hemispherical projections, and the secondary dots, which are additionally provided, may be columnar projections. In this case, the secondary dots may be smaller in diameter and height than the primary dots. Hemispherical dots are superior to columnar dots in light diffusing and reflecting characteristics. On the other hand, columnar dots can be produced at a lower cost. Therefore, hemispherical dots are used as primary dots, and columnar dots are used as supplementary secondary dots.

The secondary dots provided in a boundary area that borders the surrounding part of the at least part of the light reflecting surface may be distributed at a lower density than the secondary dots provided in an other area of the at least part of the light reflecting surface.

In addition, the present invention provides a backlight unit including the above-described light guide plate and a light source disposed adjacent to a light entrance surface of the light guide plate to emit light into the light guide plate through the light entrance surface.

In addition, the present invention provides a display apparatus including an image display panel and the above-described backlight unit disposed at the back of the image display panel.

Embodiments of the present invention will be explained below with reference to the accompanying drawings. It should be noted that the scale of constituent members shown in the figures used in the following description is properly changed for the sake of explanation.

DETAILED DESCRIPTION OF THE PREFERRED EMBODIMENTS

Figure 5:
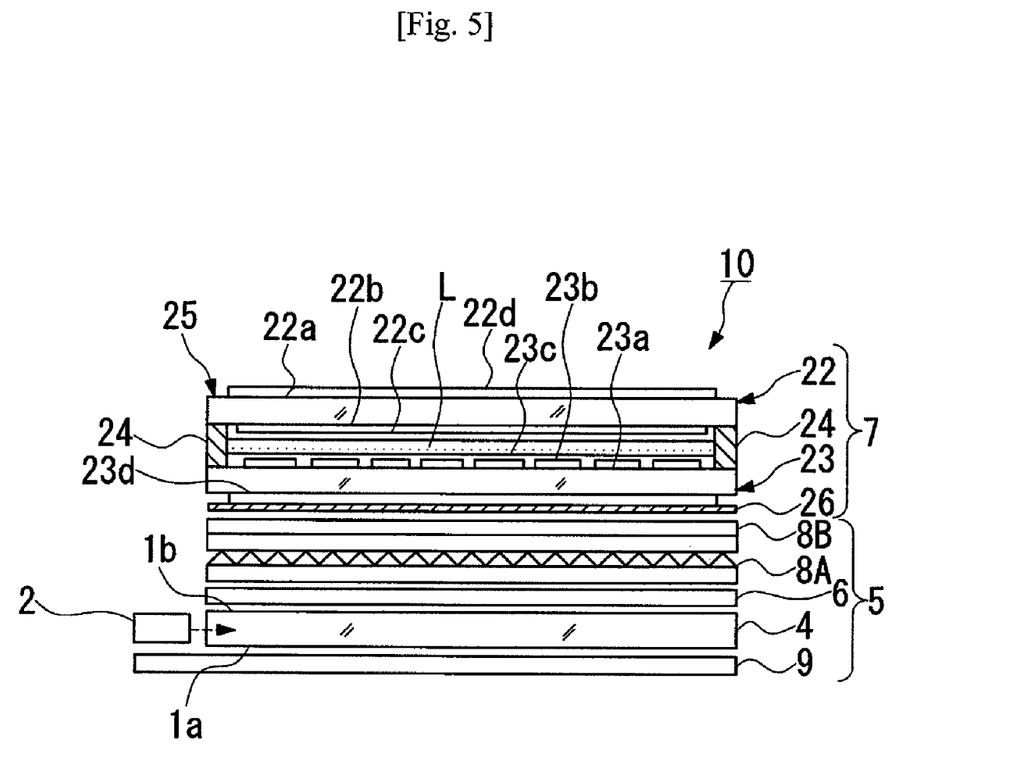
FIG. 5 is a schematic sectional view showing a display apparatus having the backlight unit shown in FIG. 4.
Figure 7:
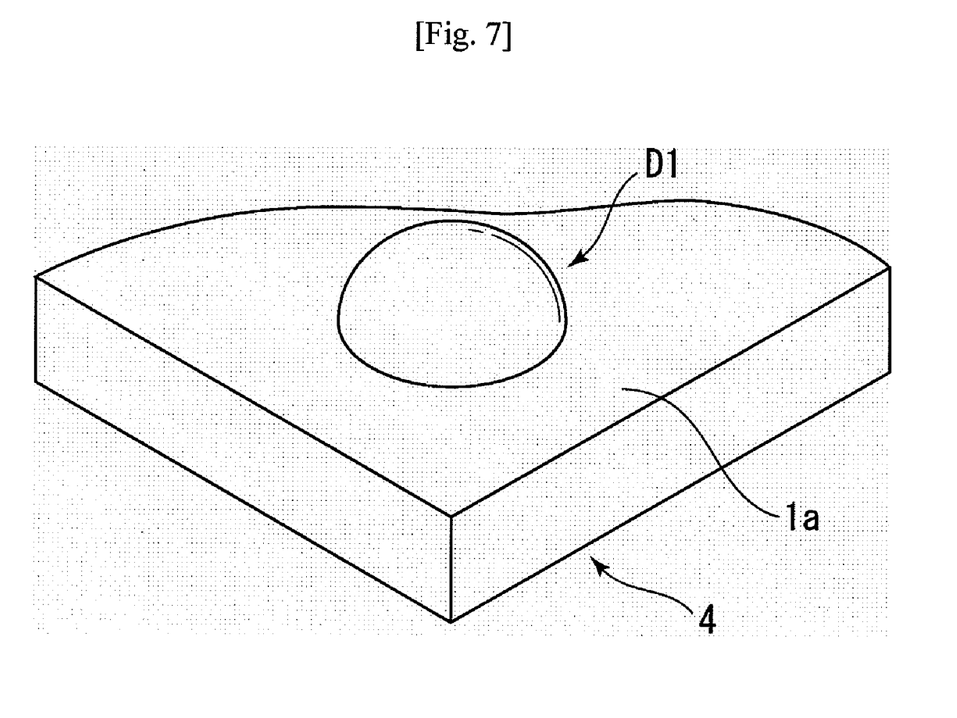
FIG. 7 is a perspective view showing hemispherical dots as one form of dots on the light guide plate according to the present invention.
Figure 8:
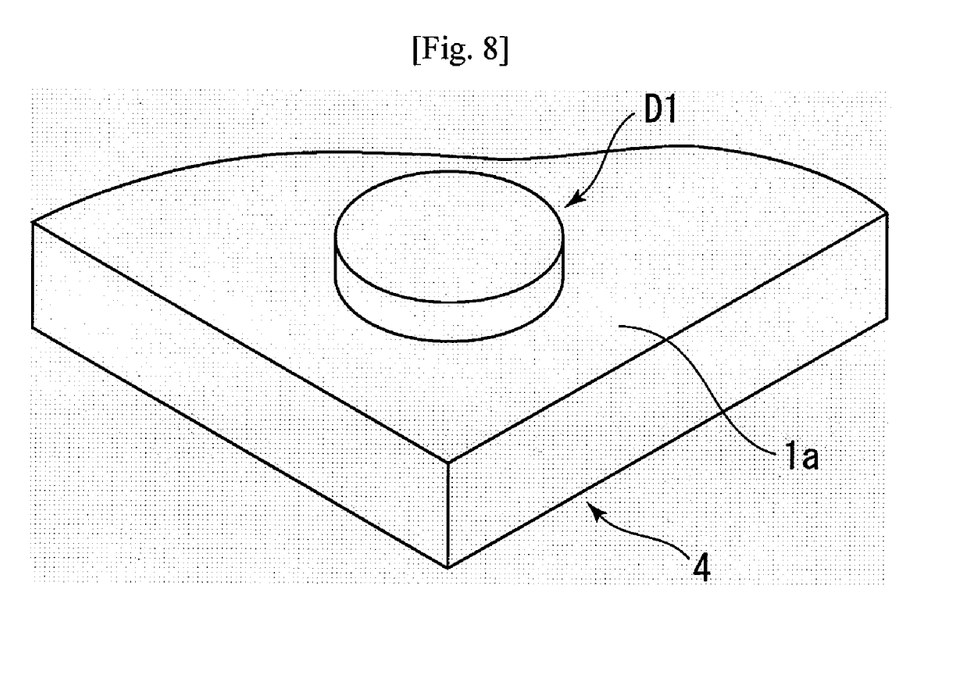
FIG. 8 is a perspective view showing columnar dots as another form of dots on the light guide plate according to the present invention.

A light guide plate producing method according to an embodiment of the present invention is to produce a light guide plate 4, as shown in FIG. 5, which is used in a backlight unit 5 of a liquid crystal display apparatus 10. The light guide plate 4 has a light exiting surface 1b, which is an upper surface as viewed in FIG. 5, a light reflecting surface 1a, which is a lower surface, and a light entrance surface that receives light from a light source 2. The light reflecting surface 1a has a multiplicity of light reflective dots formed thereon to diffuse and reflect light entering the light guide plate 4 so as to allow the light to exit from the light exiting surface 1b uniformly. In the following embodiment, the light reflective dots are formed as short hemispherical or columnar projections projecting from the light reflecting surface 1a (see FIGS. 7 and 8). The light reflective dots, however, may be recesses and may be formed by printing.

Figure 1:
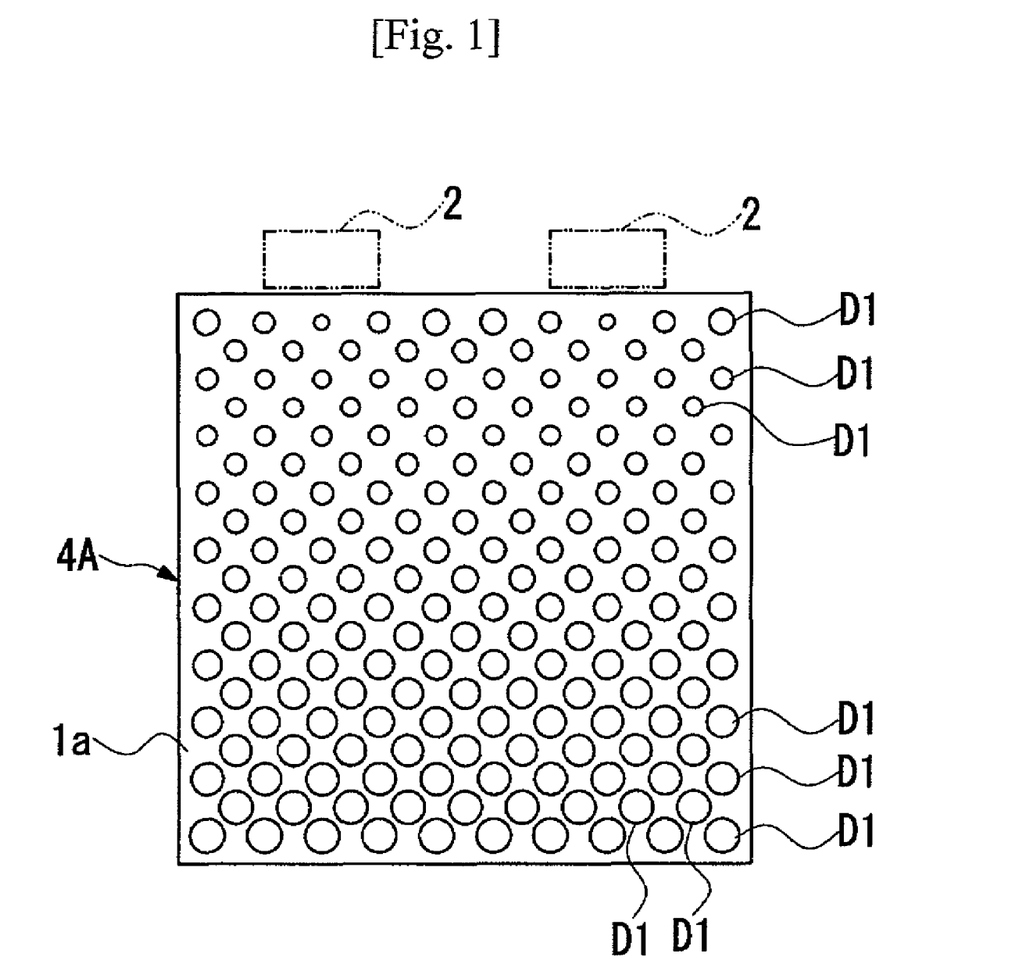
FIG. 1 is a plan view of a first prototype formed in a first prototype producing step of a light guide plate producing method according to an embodiment of the present invention.

In the light guide plate producing method, firstly, as shown in FIG. 1, a distribution pattern of primary dots D1 to be formed on the light reflecting surface 1a is determined on the basis of a computer simulation or the like, and a first prototype 4A is produced which has the primary dots D1 formed on the light reflecting surface 1a (first prototype producing step). More specifically, a mold is made that has a plurality of recesses for forming the primary dots D1, and a first prototype 4A is produced by injection-molding a transparent polycarbonate or acrylic resin using the mold.

Although in the illustrated example the primary dots D1 are distributed in a polka-dot pattern, they may be arranged in any of various two-dimensional patterns in which the primary dots D1 are spaced from each other, such as a lattice pattern. As shown in FIG. 1, the primary dots D1 are, in general, formed so that the diameter thereof is small near the light sources 2 and becomes larger as the distance from the light sources 2 increases. The height of the primary dots D1 also becomes higher as the distance from the light sources 2 increases.

Next, optical characteristics of the first prototype 4A relating to light exiting from the light exiting surface 1b, such as luminance at the light exiting surface 1b, are measured by making light enter the first prototype 4A through the light entrance surface, locating a part X where optical characteristics are not satisfactory.

Figure 2:
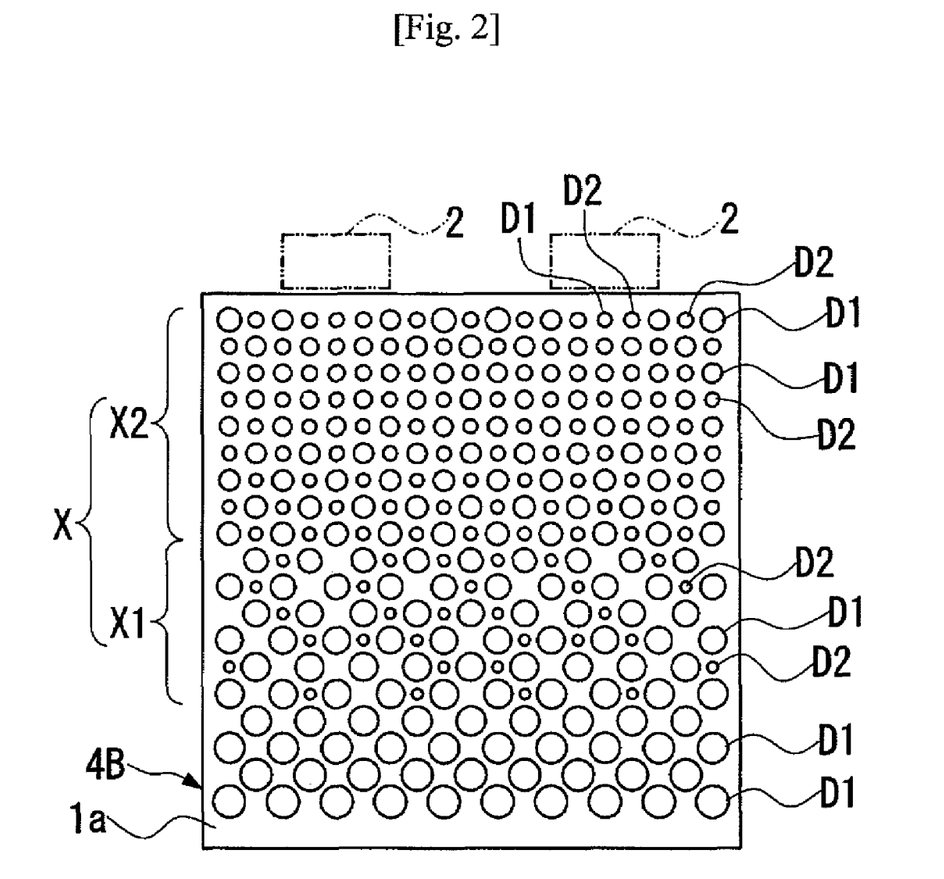
FIG. 2 is a plan view of a second prototype formed in a second prototype producing step of the light guide plate producing method.

After the part X has been located, secondary dots D2 are formed between the primary dots D1 in the part X (second prototype producing step). More specifically, the above-described mold is subjected to additional processing to form secondary dots D2, thereby producing a second prototype 4B. If the luminance at a part X of the light exiting surface 1b that is closer to the light entrance surface is lower than at the other part, for example, secondary dots D2 are formed in the part X as shown in FIG. 2.

The secondary dots D2 are each provided at the midpoint between a pair of adjacent primary dots D1 and formed with a smaller diameter and a lower height than the surrounding primary dots D1.

In a boundary area X1 of the part X that borders a surrounding part, secondary dots D2 are formed at a lower density and with a smaller diameter and a lower height than the dots D2 formed in the remaining area X2 of the part X.

The above-described measurement of optical characteristics relating to exiting light is performed, for example, by using a luminance and color shading analyzer (e.g. EYE-Scale, available from I System Corporation). With the luminance and color shading analyzer, the light exiting surface is divided into a predetermined number of areas, and the luminance at each divided area is measured, allowing discrimination between bright and dark areas. Accordingly, secondary dots D2 are formed in a dark area located by this inspection to obtain a predetermined luminance. For example, the luminance at an area immediately in front of each light source 2 and the luminance at an area between areas immediately in front of mutually adjacent light sources 2 are measured with the above-described analyzer, and secondary dots D2 are additionally formed in a dark area in front of and between the light sources 2. Thus, the luminance at the dark area can be increased.

Figure 3:
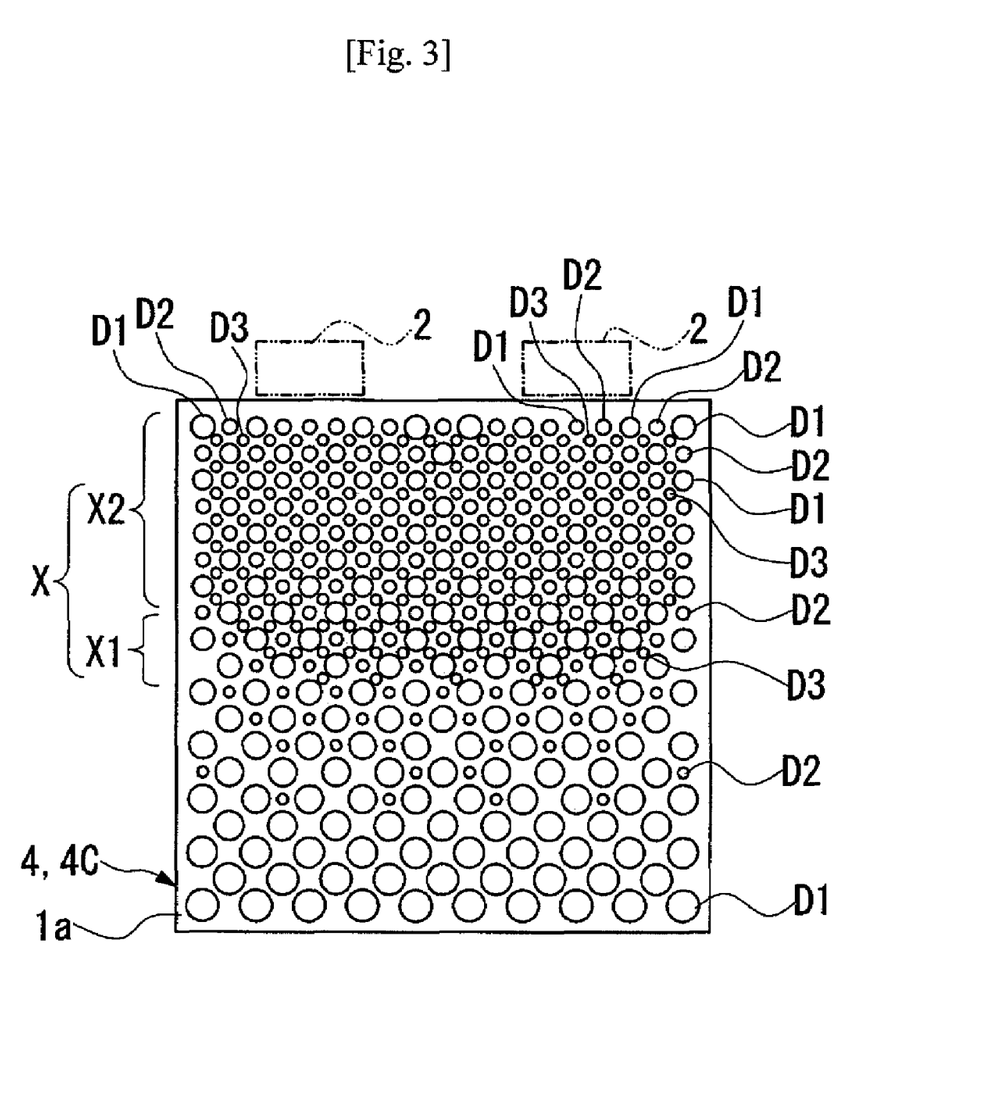
FIG. 3 is a plan view of a third prototype formed in the second prototype producing step of the light guide plate producing method.

The above-described measurement is also performed on the second prototype 4B. If the second prototype 4B does not exhibit satisfactory optical characteristics described above, a third prototype producing step similar to the above is carried out. FIG. 3 shows a third prototype 4C with tertiary dots D3 produced through the additional prototype producing step. The dimensional relationship between the tertiary dots D3 and the secondary dots D2 is the same as that between the secondary dots D2 and the primary dots D1. The relationship between tertiary dots D3 formed in the areas X1 and X2 is also the same as in the case of the second prototype 4B.

Thus, the optical characteristics of a prototype are measured each time additional dots are formed, and the same one mold is additionally processed to form additional dots until a prototype is produced which exhibits satisfactory optical characteristics.

Figure 6:
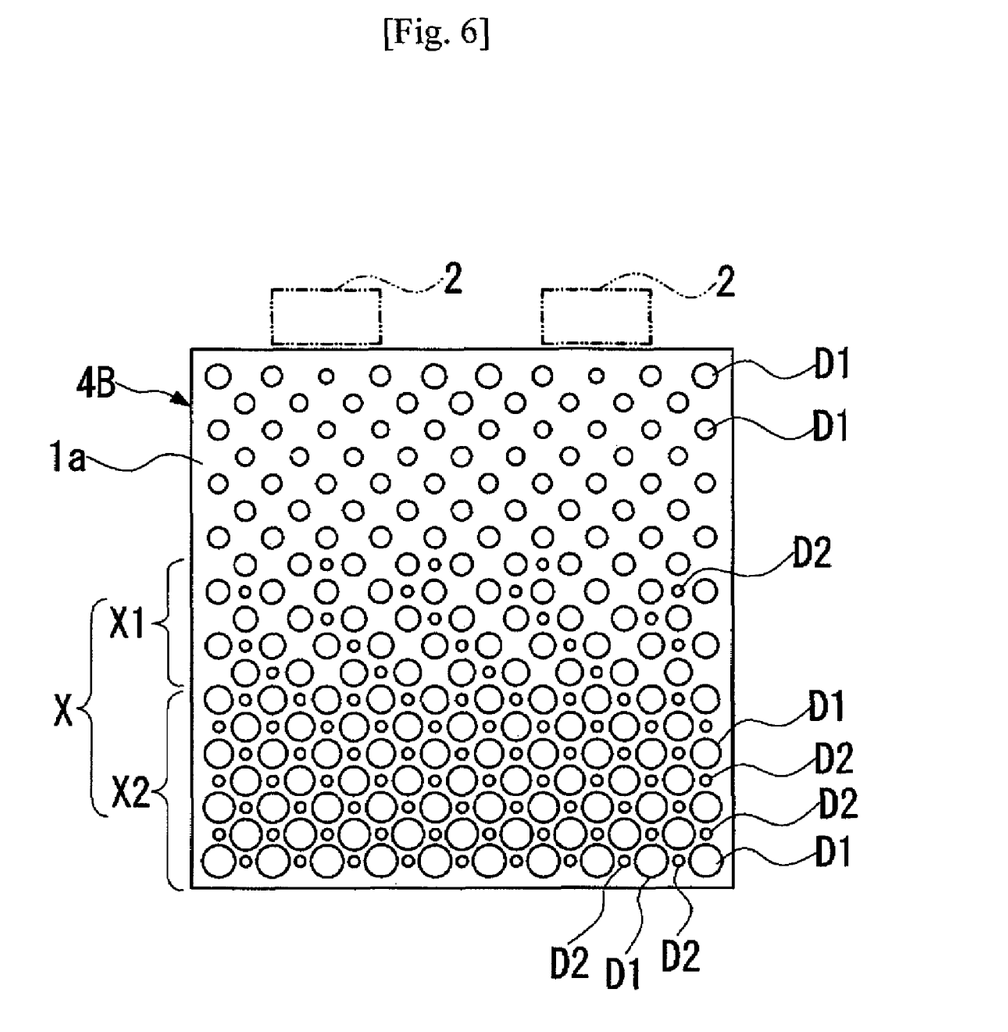
FIG. 6 is a plan view showing a different prototype formed by the light guide plate producing method.

FIG. 6 shows a second prototype 4B having secondary dots D2 formed thereon in the same way as the above when the luminance at a part X of the first prototype 4A remote from the light sources 2 is low, in reverse relation to the case shown in FIG. 1.

Figure 4:
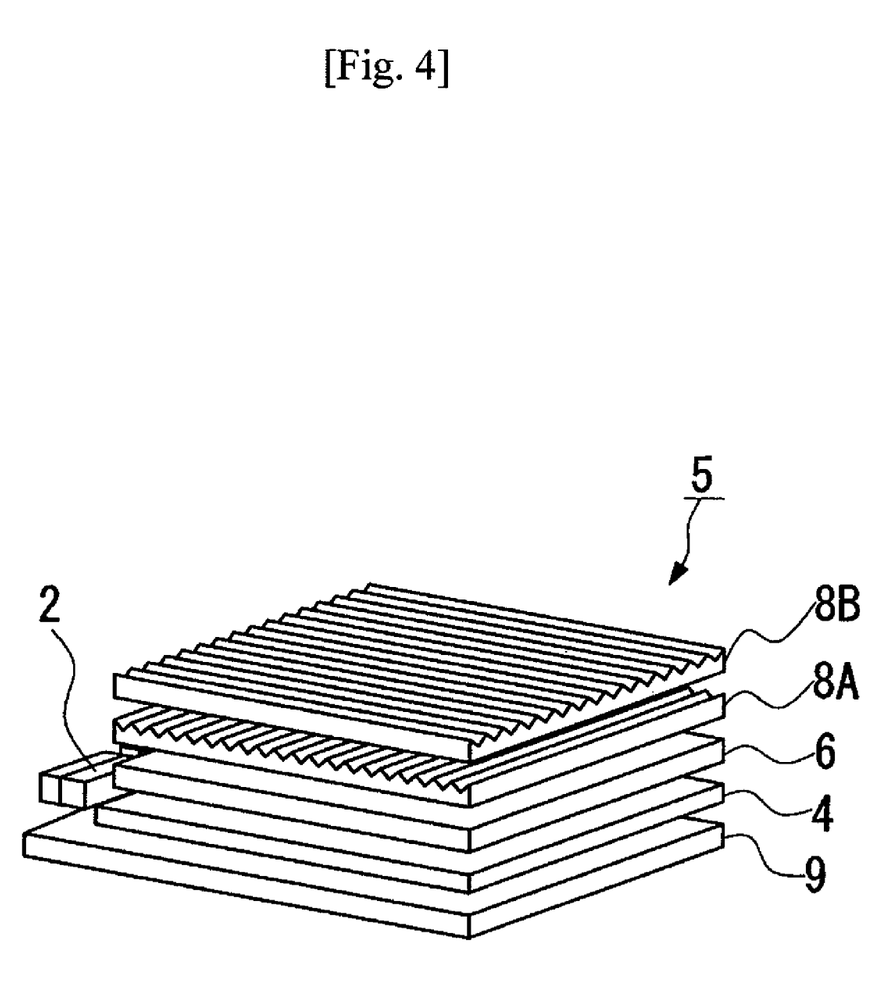
FIG. 4 is a schematic perspective view showing a backlight unit using a light guide plate formed by using the light guide plate producing method.

The backlight unit 5 in this embodiment has, as shown in FIGS. 4 and 5, the above-described light guide plate 4, light sources 2, a diffusing sheet 6, a first prism sheet 8A, a second prism sheet 8B, and a reflecting sheet 9. The diffusing sheet 6 is disposed over the light guide plate 4 to diffuse light exiting from the light guide plate 4. The first and second prism sheets 8A and 8B direct light exiting from the diffusing sheet 6 toward a liquid crystal display panel 7 as illuminating light. The reflecting sheet 9 is disposed underneath the light guide plate 4.

The first and second prism sheets 8A and 8B each have a plurality of mutually parallel elongated prisms on their respective upper surfaces, and their respective prisms of the first and second prism sheets 8A and 8B are disposed to substantially perpendicularly intersect each other in plan view.

The reflecting sheet 9 is a metal plate, film, foil or the like having light-reflecting characteristics. In this embodiment, the reflecting sheet 9 is a film provided with an evaporated silver layer. It should be noted, however, that an evaporated aluminum layer or the like may be used in place of the evaporated silver layer.

The light sources 2 are a plurality of white light-emitting diodes (LEDs) disposed along the light entrance surface of the light guide plate 4. The white LEDs are, for example, each formed by sealing at least one semiconductor light-emitting element on a substrate with a resin material. The semiconductor light-emitting element is, for example, a blue (wavelength $\lambda$: 470 to 490 nm) LED element or an ultraviolet (wavelength $\lambda$: less than 470 nm) LED element, which is formed, for example, by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed by adding, for example, a YAG fluorescent substance into a silicone resin as a main component. The YAG fluorescent substance converts blue or ultraviolet light from the semiconductor light-emitting element into yellow light, and white light is produced by color mixing effect. It should be noted that various LED elements in addition to those described above can be used as the white LEDs.

The display apparatus 10 in this embodiment is a liquid crystal display apparatus applicable, for example, to a liquid crystal display for use in a mobile phone, a personal digital assistant (PDA) or an automatic teller machine (ATM). The display apparatus 10 has a liquid crystal display panel 7 and the above-described backlight unit 5 disposed at the back of the liquid crystal display panel 7.

The liquid crystal display panel 7 is a transmissive or semitransmissive type liquid crystal display panel. For example, the liquid crystal display panel 7 in this embodiment is of the semitransmissive type and has a panel body 25 having a liquid crystal material L sealed with a sealant 24 in a gap between an upper substrate 22 and a lower substrate 23. A semitransmitting-reflecting sheet 26 having both light-transmitting and reflecting characteristics is disposed underneath the panel body 25. As the liquid crystal material L, for example, TN liquid crystal or STN liquid crystal may be used.

The upper substrate 22 comprises an upper transparent substrate 22a made of glass, for example. An upper transparent electrode layer 22b made of an ITO (Indium Tin Oxide) film is disposed on the lower surface of the upper transparent substrate 22a. An upper alignment film 22c is disposed on the lower surface of the upper transparent electrode layer 22b. The upper alignment film 22c is formed by applying an alignment treatment to a transparent polyimide resin film or the like. In addition, an upper polarizer 22d is disposed on the upper surface of the upper transparent substrate 22a.

The lower substrate 23 comprises a lower transparent substrate 23a made of glass, for example. A lower transparent electrode layer 23b made of an ITO film is disposed on the upper surface of the lower transparent substrate 23a. A lower alignment film 23c is disposed on the upper surface of the lower transparent electrode layer 23b. The lower alignment film 23c is formed by applying an alignment treatment to a transparent polyimide resin film or the like. In addition, a lower polarizer 23d is disposed on the lower surface of the lower transparent substrate 23a.

The semitransmitting-reflecting sheet 26 may be an aluminum-evaporated sheet having light-transmitting properties, or a reflective polarizer, for example. It should be noted that a spacer (not shown) comprising silica balls or plastic balls, for example, is dispersedly disposed in the gap between the upper and lower substrates 22 and 23, ensuring a desired amount of gap.

It should be noted that the present invention is not necessarily limited to the foregoing embodiments but can be modified in a variety of ways without departing from the scope of the present invention.

Although it is preferable to use white LEDs as the light sources 2, as has been stated above, a linear fluorescent tube light source may be used as the light sources 2.

Although in the foregoing embodiments the liquid crystal display panel 7 is used as an image display panel, other types of image display panels may be used, for example, an electronic paper.

The invention claimed is:

1. A method of producing a light guide plate comprising a light exiting surface and a light reflecting surface opposite to the light exiting surface, the light reflecting surface having a plurality of light reflective dots formed thereon in a scattered fashion, the method comprising:

(a) producing a first prototype of the light guide plate in which primary dots are formed on a light reflecting surface of the first prototype;

(b) examining optical characteristics of the first prototype relating to light exiting from a light exiting surface of the first prototype;

(c) producing a second prototype of the light guide plate when the examined first prototype exhibits optical characteristics which are not satisfactory, the second prototype comprising, on a light reflecting surface thereof, primary dots that are the same as the primary dots of the first prototype in size and distribution, and secondary dots having a smaller diameter and height than the primary dots and arranged between the primary dots in at least part of the light reflecting surface to improve the optical characteristics of the second prototype; and (d) repeating steps (b) and (c) until a prototype is produced which exhibits satisfactory optical characteristics, wherein the second prototype is examined in step (b).

2. The method of claim 1, wherein the secondary dots formed in step (c) are made to be smaller in size than the previously formed dots.

3. The method of claim 1, wherein the primary dots and the secondary dots are hemispherical projections projecting from the light reflecting surface.

4. The method of claim 1, wherein the primary dots are hemispherical projections projecting from the light reflecting surface, and the secondary dots are columnar projections projecting from the light reflecting surface.

5. The method of claim 1, wherein the primary dots and the secondary dots are columnar projections projecting from the light reflecting surface.

6. The method of claim 1, wherein the secondary dots provided in a boundary area of the at least part of the light reflecting surface that borders a surrounding part are distributed at a lower density than the secondary dots provided in an other area of the at least part of the light reflecting surface.

7. A light guide plate comprising:
a light exiting surface; and
a light reflecting surface opposite to the light exiting surface, the light reflecting surface having a plurality of light reflective dots formed thereon in a scattered fashion, the dots including:
primary dots; and
secondary dots arranged between the primary dots in at least part of the light reflecting surface to improve optical characteristics of the light guide plate relating to light exiting from the light exiting surface, the secondary dots having a lower reflectivity than primary dots surrounding them and the secondary dots being smaller in diameter and height than the primary dots.

8. The light guide plate of claim 7, wherein the primary dots and the secondary dots are hemispherical projections.

9. The light guide plate of claim 7, wherein the primary dots are hemispherical projections, and the secondary dots are columnar projections.

10. The light guide plate of claim 7, wherein the primary dots and the secondary dots are columnar projections.

11. The light guide plate of claim 7, wherein the secondary dots provided in a boundary area that borders a surrounding part of the at least part of the light reflecting surface are distributed at a lower density than the secondary dots provided in an other area of the at least part of the light reflecting surface.

12. A backlight unit comprising:
the light guide plate of claim 7, the guide plate further comprising a peripheral edge surface extending between peripheral edges of the light exiting and reflecting surfaces; and
a light source disposed adjacent to a light entrance surface as a part of the peripheral edge surface of the light guide plate.

13. A display apparatus comprising:
an image display panel; and
the backlight unit of claim 12 disposed at a back of the image display panel.

14. A light guide plate comprising:
a light exiting surface; and
a light reflecting surface opposite to the light exiting surface, the light reflecting surface having a plurality of light reflective dots formed thereon in a scattered fashion, the dots including:
primary dots; and
secondary dots arranged between the primary dots in at least part of the light reflecting surface to improve optical characteristics of the light guide plate relating to light exiting from the light exiting surface, the secondary dots having a lower reflectivity than primary dots surrounding them, wherein the primary dots and the secondary dots are hemispherical projections, the secondary dots being smaller in diameter and height than the primary dots.

15. A light guide plate comprising:
a light exiting surface; and
a light reflecting surface opposite to the light exiting surface, the light reflecting surface having a plurality of light reflective dots formed thereon in a scattered fashion, the dots including:
primary dots; and
secondary dots arranged between the primary dots in at least part of the light reflecting surface to improve optical characteristics of the light guide plate relating to light exiting from the light exiting surface, the secondary dots having a lower reflectivity than primary dots surrounding them, wherein the primary dots are hemispherical projections, and the secondary dots are columnar projections smaller in diameter and height than the primary dots.

16. A light guide plate comprising:
a light exiting surface; and
a light reflecting surface opposite to the light exiting surface, the light reflecting surface having a plurality of light reflective dots formed thereon in a scattered fashion, the dots including:
primary dots; and
secondary dots arranged between the primary dots in at least part of the light reflecting surface to improve optical characteristics of the light guide plate relating to light exiting from the light exiting surface, the secondary dots having a lower reflectivity than primary dots surrounding them, wherein the primary dots and the secondary dots are columnar projections, the secondary dots being smaller in diameter and height than the primary dots.

* * * * *